(12) United States Patent
Guruprasad

(10) Patent No.: US 8,903,670 B2
(45) Date of Patent: Dec. 2, 2014

(54) DISTANCE-DEPENDENT SPECTRA WITH UNIFORM SAMPLING SPECTROMETRY

(76) Inventor: Venkata Guruprasad, Brewster, NY (US)

( * ) Notice: Subject to any disclaimer, the term of this patent is extended or adjusted under 35 U.S.C. 154(b) by 2079 days.

(21) Appl. No.: 12/996,116

(22) PCT Filed: Feb. 14, 2006

(86) PCT No.: PCT/US2006/005103
§ 371 (c)(1),
(2), (4) Date: Dec. 3, 2010

(87) PCT Pub. No.: WO2007/008255
PCT Pub. Date: Jan. 18, 2007

(65) Prior Publication Data
US 2011/0125439 A1    May 26, 2011

Related U.S. Application Data

(60) Provisional application No. 60/698,459, filed on Jul. 13, 2005.

(51) Int. Cl.
| | |
|---|---|
| *G06F 19/00* | (2011.01) |
| *G01S 3/782* | (2006.01) |
| *G01S 3/02* | (2006.01) |
| *G01S 11/12* | (2006.01) |
| *H04L 27/26* | (2006.01) |

(52) U.S. Cl.
CPC . *G01S 3/782* (2013.01); *G01S 3/02* (2013.01); *G01S 11/12* (2013.01); *H04L 27/2647* (2013.01)
USPC ............................................. 702/79

(58) Field of Classification Search
USPC ............... 702/70, 72, 73, 79, 158, 189, 190; 356/4.01, 5.03, 5.1; 342/99, 158, 159, 342/195, 196; 375/131, 138, 220, 259, 272; 370/280, 281
See application file for complete search history.

(56) References Cited

U.S. PATENT DOCUMENTS

| | | | |
|---|---|---|---|
| 5,796,776 A | 8/1998 | Lomp | |
| 5,903,238 A | 5/1999 | Sokat | |
| 6,104,435 A * | 8/2000 | Kim | 348/531 |

(Continued)

OTHER PUBLICATIONS

V. Guruprasad, "The Correct Analysis and Explanation of the Pioneer-Galileo Anomalies", published on the Internet at http://www.arxiv.org on Sep. 17, 1999 as arXiv:astro-ph/9907363 v4.

(Continued)

*Primary Examiner* — Manuel L Barbee
(74) *Attorney, Agent, or Firm* — Ostrager Chong Flaherty & Broitman P.C.

(57) ABSTRACT

In a receiver of electromagnetic or other waves, scaling of received frequencies in proportion to the respective source distances, so as to reveal the source distances and permit isolation of signals from a particular source by simple spectral filtering. Phase differences between transmitted frequencies due to the common source path lead to chirp eigenfunctions registering in the receiver as scaled frequencies. The chirps are extracted by implementing exponentially varying path delays in autocorrelators and diffractive spectrometers say using a medium with variable refractive index. Analogous exponentially varying phase shifts are applied to successive samples in the kernel of discrete Fourier transform implementations. Advantage lies in enabling distance-dependent frequency scaling in autocorrelation spectroscopy, as well as in conventional diffractive or refractive spectrometers or digital signal processing with uniform sampling.

20 Claims, 6 Drawing Sheets

Computation of $F(0)$

(56) References Cited

U.S. PATENT DOCUMENTS

| | | |
|---|---|---|
| 6,233,045 B1 | 5/2001 | Suni |
| 6,490,028 B1 | 12/2002 | Ditto |
| 7,106,801 B1 | 9/2006 | Guruprasad |
| 2005/0073689 A1 | 4/2005 | Pang |
| 2005/0195103 A1 | 9/2005 | Davis |
| 2006/0007423 A1 | 1/2006 | Guruprasad |
| 2006/0103571 A1 | 5/2006 | Isaji |

OTHER PUBLICATIONS

V. Guruprasad, "Relativity of Spatial Scale and of Hubble Flow: The Logical Foundations of Relativity and Cosmology", published on the Internet at http://arxiv.org on May 4, 2000 as arXiv:gf-qc/0005014 vl.

V. Guruprasad, "Contraction and Distention by Tidal Stress and its Role as the Cause of the Hubble Redshift", published on the Internet at http://arxiv.org on May 22, 2000 as arXiv:gr-qc/0005090 v2.

* cited by examiner

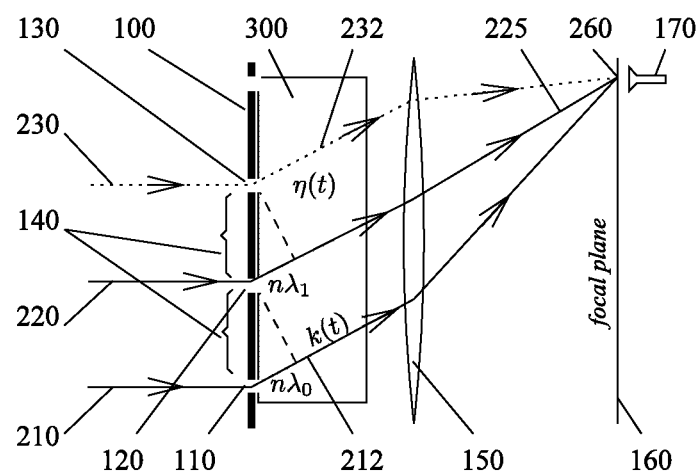
Figure 1: Implementation using variable refractive index
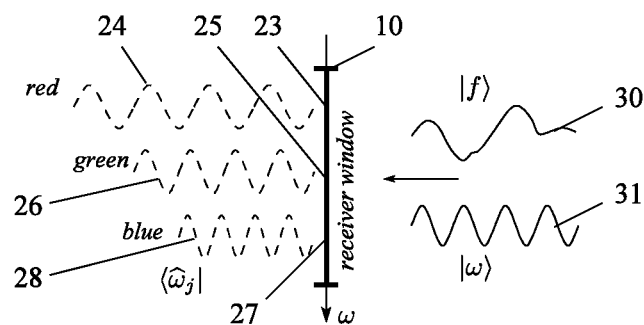
Figure 2: Spectral window of a conventional receiver

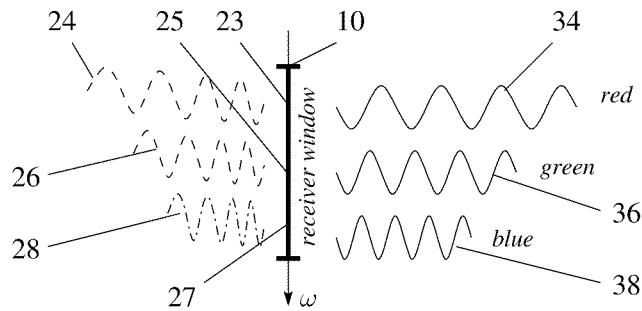
Figure 3: Moving spectral window of a changing receiver
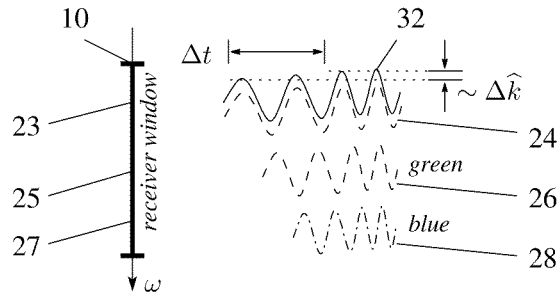
Figure 4: Chirp extraction by the changing receiver
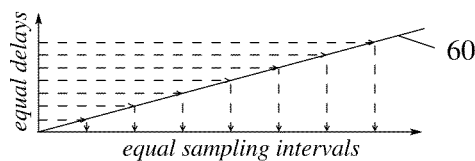
Figure 5: Traditional sampling time-path delay relation
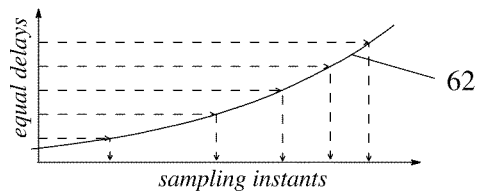
Figure 6: Sampling time-path delay relation for variable sampling
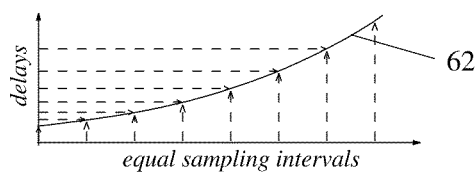
Figure 7: Sampling time-path delay relation for variable delay

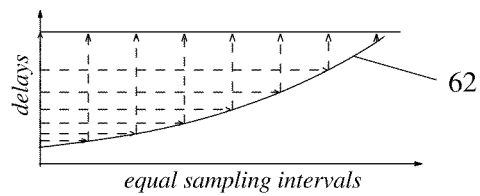
Figure 8: Inversion for variable delays
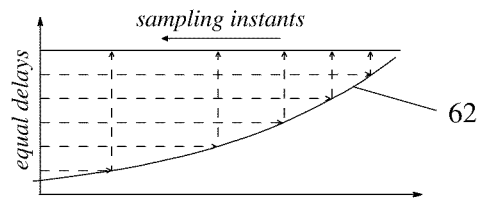
Figure 9: Inversion for variable sampling
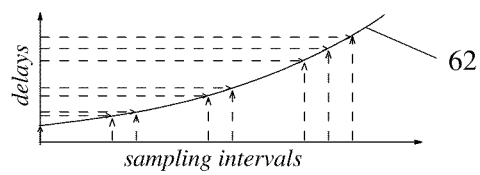
Figure 10: Sampling time-path delay relation for combined variations
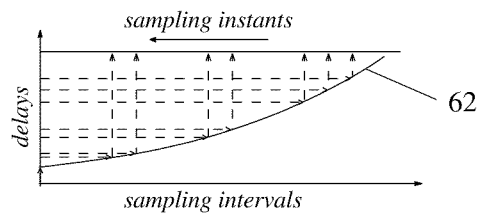
Figure 11: Combined delay and sampling variation inversions
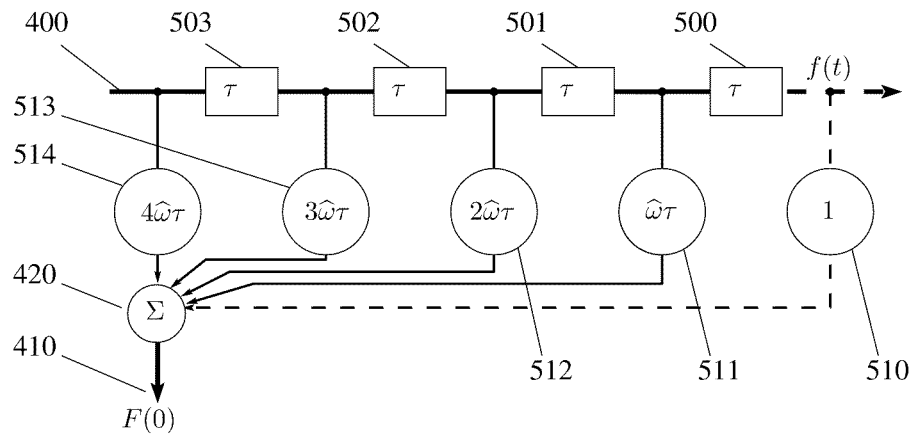
Figure 12: Computation of $F(0)$

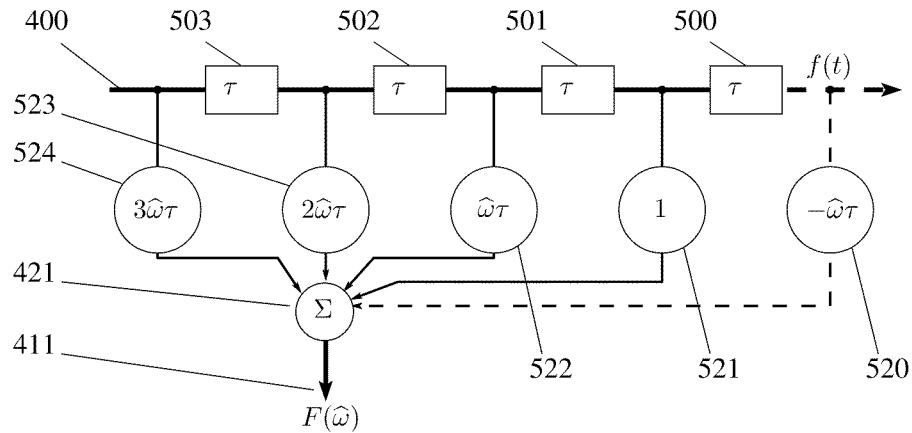
Figure 13: Computation of $F(\widehat{\omega})$
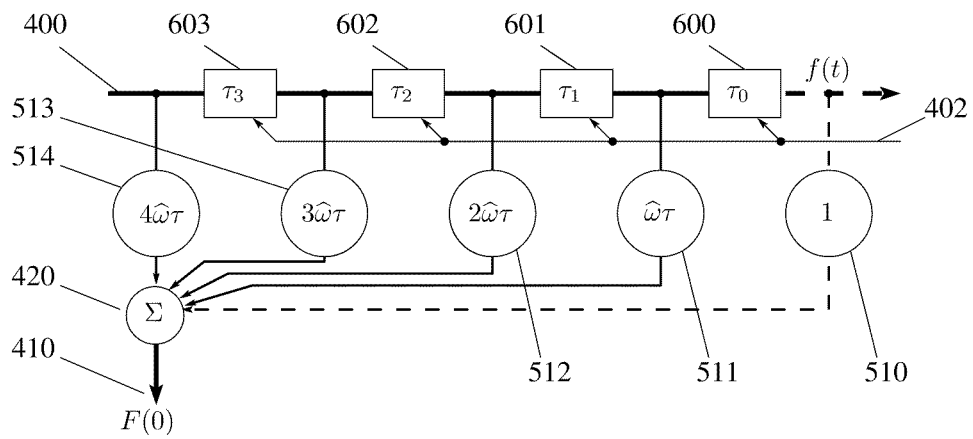
Figure 14: Computation of $\mathcal{F}(0)$ by variable sampling
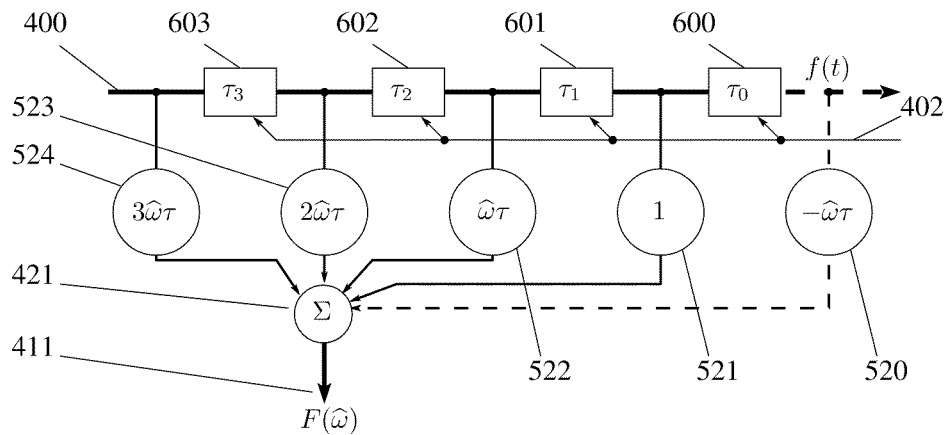
Figure 15: Computation of $\mathcal{F}(\widehat{\omega})$ by variable sampling

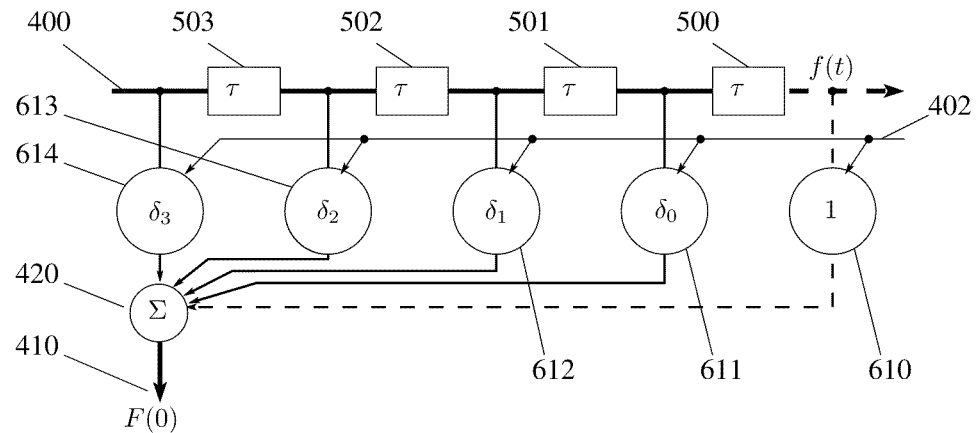
Figure 16: Computation of $\mathcal{F}(0)$ by variation of phases
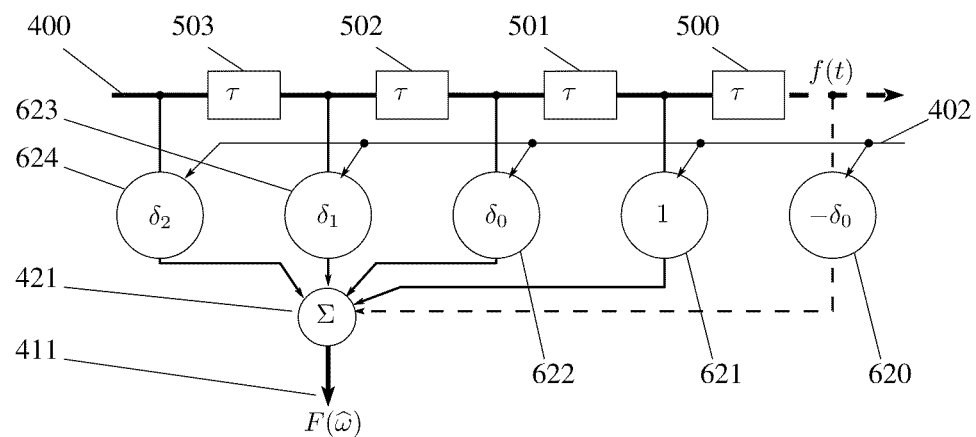
Figure 17: Computation of $\mathcal{F}(\widehat{\omega})$ by variation of phases

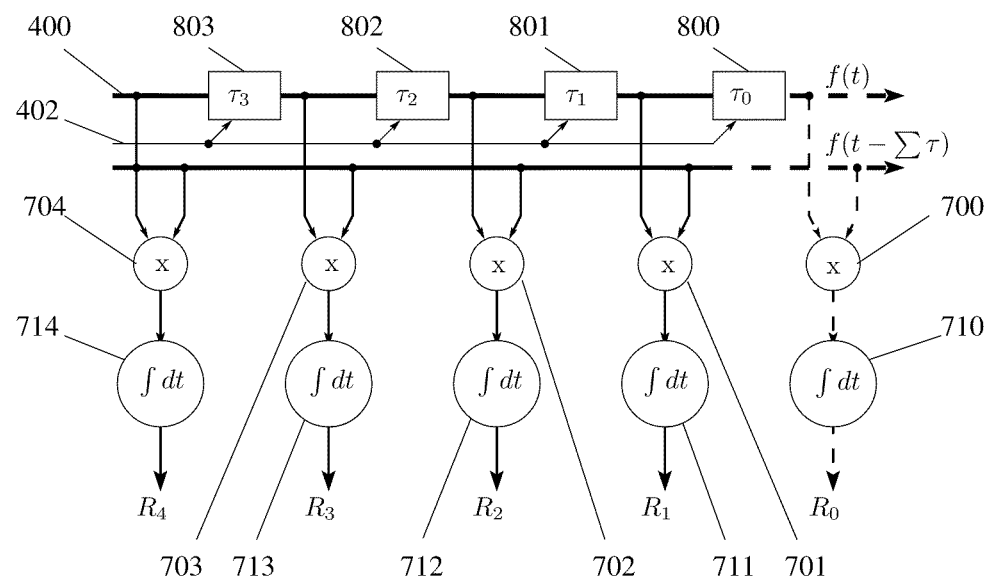
Figure 18: Implementation in autocorrelation

DISTANCE-DEPENDENT SPECTRA WITH UNIFORM SAMPLING SPECTROMETRY

RELATED APPLICATIONS

This application is a 371 of International Application No. PCT/US06/05103 filed Feb. 14, 2006, which claims benefit of U.S. Provisional Patent Application No. 60/698,459 filed Jul. 13, 2005.

BACKGROUND OF THE INVENTION

1. Technical Field

This invention pertains to determination of the distance from a receiver of a source of electromagnetic or other waves, and to separation of signals from different sources depending on the respective distances. More particularly, it concerns extraction of spectral components so as to exhibit a dependence on the distances of the sources that can then be used for determining the source distance or for separating the signals from individual sources.

2. Brief Description of the Prior Art

Distance-Dependent Scaling of Frequencies

In a first copending application, titled "Passive distance measurement using spectral phase gradients", filed 2 Jul. 2004, Ser. No. 10/884,353, and incorporated herein by reference, a method has been described for extracting the information of the distance to a source of electromagnetic or other wave signal received by a receiver by causing, at the receiver, the spectrum of the signal to shift in proportion to the distance and independently of the signal modulation and content.

The shift is characterized by a parametric operator $H(\beta)$ defined as $$H(\beta)|\omega, r\rangle = e^{ikr(1+\beta r/c)} \left| \frac{\omega}{1+\beta r/c} \right\rangle, \quad (1)$$

where r is the source distance, k and $\omega$ respectively denote the wave vector and the angular frequency, c is the wave speed, $|\omega, r\rangle$ represents the incoming wave state in quantum mechanical notation, and $$\beta = \frac{1}{\hat{\omega}} \frac{d\hat{\omega}}{dt} \equiv \frac{1}{\hat{k}} \frac{d\hat{k}}{dt}, \quad (2)$$

where t is the observation time and $\hat{k}$ and $\hat{\omega}$, the wave vector and angular frequency instantaneously selected at the receiver.

Equation (1) reveals that the shifts would be proportional to the original frequencies, as in the Doppler effect, and thus amount to a scaling of frequencies by the scale factor $$z(\beta, r) \equiv \frac{\delta\omega}{\hat{\omega}} = \frac{\beta r}{c} = \alpha r \text{ where } \alpha \equiv \beta/c. \quad (3)$$

Unlike the Doppler effect, this scaling is independent of relative motion, depending instead on the relative distance, and is inherently asymmetric, as the causative parameter $\beta$ is receiver-defined. Equation (2) further reveals that continuous variation of the receiver's instantaneous selection or tuning, represented by the rate of change factor $d\hat{k}/dt$, is key to obtaining the shift, which is also described by the resulting orthogonality condition $$\langle\hat{\omega}|H(\beta)|\omega,t\rangle = \int_t e^{i\hat{\omega}\Delta(t)} e^{i[kr\Delta(r)-\omega t]} dt = \int_t e^{ikr\Delta} e^{i(\hat{\omega}\Delta-\omega t)} dt = e^{ikr\Delta}\delta[\hat{\omega}\Delta-\omega], \quad (4)$$

wherein the first factor $\exp[i\hat{\omega}\Delta(t)] = \langle\hat{\omega}|H(\beta)$ represents the (forward) Fourier transform kernel $\langle\hat{\omega}| \equiv \exp(i\hat{\omega}t)$ modified by varying the instantaneous selection or tuning, with $\Delta \equiv \Delta(r) = (1+\beta r/c)$ and $\Delta \equiv \Delta(t) = (1+\beta t)$, since c=r/t. The modified transform no longer selects ordinary Fourier components $\exp[i(kr-\omega t)]$, but would clearly accept $H^{-1}(\beta)|\omega\rangle \equiv \exp[i(kr-\omega t/\Delta)]$ as the $\Delta$ factors would cancel out. The eigenfunction $\exp[i(kr-\omega t/\Delta)]$ is a spectral component of time-varying frequency, representing the view of a receiver whose very scale of time is instantaneously changing.

Such decomposition, while not of much use in prior art, is legitimately within a receiver's prerogative for analyzing received signals. The eigenfunction is also equivalent to $\exp[i(kr\Delta-\omega t)]$, projecting the variation of scale from time to path length. Wavefunctions of varying frequency are known as chirps in radar, but in all art prior to the first copending application, chirps have been expressly generated as in radar and otherwise sought in received signals only from specific chirp sources, such as gravitational waves from a collapsing binary star system. Chirp transforms have been also applied in image processing for their capability for extracting or preserving scale-related features that would be lost in ordinary Fourier methods. The difference over prior art in the first copending application is that the chirps are extracted from arbitrary received waveforms.

Equation (4) implies that each incoming Fourier component $\omega$ in effect gets measured at its scaled value $\omega/\Delta$. As explained in the first copending application, the mechanism critically depends on the fact that no real signal can be absolutely monochromatic since nonzero spreading of frequency is necessary for energy and information transport. Equation (2) relates the distance-frequency scale factor $\beta$ to the instantaneous rate of scanning of the received signal spectrum, and the measured amplitude or energy at each selected frequency $\hat{\omega}$ comes from integration, via equation (4), over a nonzero differential interval of this spread around the corresponding source frequency $\omega$. Injection of the shift factor $\Delta$ into the forward Fourier kernel $\exp(i\hat{\omega}t)$ on the left of equation (4) results from a further relation $$\delta\omega = \frac{\partial\phi}{\partial k}\frac{d\hat{k}}{dt} = \frac{\hat{\omega}\beta r}{c} \text{ so that } \omega = \hat{\omega} + \delta\omega, \quad (5)$$

obtained from a first principles consideration of the instantaneous phase of an incoming sinusoidal wave, $$\frac{d\phi}{dt} \equiv -\hat{\omega} = \frac{\partial\phi}{\partial t} + \frac{\partial\phi}{\partial r}\frac{dr}{dt} + \frac{\partial\phi}{\partial k}\frac{d\hat{k}}{dt}, \quad (6)$$

in which the first term on the right, $\partial\phi/\partial t \equiv \partial(kr-\omega t)/\partial t \equiv -\partial(\omega[t-r/c])/\partial t \equiv -\omega$, is the intrinsic rate of change of phase of the incoming wave; the second term denotes the Doppler effect of relative motion (~dr/dt) if any of the source; and the last term accounts for the changing phase contribution due to variation of the instantaneous selection $\hat{k}$ at the receiver, its first factor representing the spectral phase gradient $$\frac{\partial \phi}{\partial k} \equiv \frac{\partial (kr - \omega t)}{\partial k} = r. \quad (7)$$

Equation (5) follows from combining equations (6) and (7), for stationary sources, and indicates that the instantaneous selection $\hat{\omega}$ measures the amplitude or energy at $\omega$ in the actual incoming spectrum.

As each component of the received spectrum would be scaled independently, the amplitude distribution would be generally preserved. Although the spread of frequencies would be mostly due to modulation in a communication application, the phase contribution of modulation would be equal to a fluctuation $\mathcal{R}(t)$ of the source location around $\mathcal{R} = r$ with zero mean deviation, and the modulation thus belongs to the signal part $-i\omega t$ instead of the space part $ikr$ of the instantaneous phase $i(kr - \omega t)$ of the carrier.

Utility of the Distance-Dependent Scaling.

The above mechanism finally provides a way to determine the physical distance to a wave signal source in a fundamental way analogous to determining the direction of a source using a directional antenna or an antenna array.

A second copending application titled "Distance division multiplexing", Ser. No. 11/069,152, filed 1 Mar. 2005, with a priority date of 24 Aug. 2004 and also incorporated herein by reference, describes a combination of the H operator with conventional filters to separate signals received simultaneously from sources located at different distances, even if lying along the same direction, without regard to their modulation or content.

The result is a fundamental means to selectively receive a desired signal source that can be employed independently of all known techniques of time frequency or code division multiplexing, or in combination with these techniques, thereby making source distance or location a fundamental new dimension on par with time frequency and spread-spectrum coding for multiplexing and demultiplexing. It enables space division multiple access in a truer sense than hitherto applied to the division of solid angles subtended at communication satellite transponders.

Further, as described in a paper titled "Relaxed bandwidth sharing with Space Division Multiplexing", at the IEEE Wireless Communication and Networking Conference, March 2005, by the present inventor, the result also fundamentally improves over the traditional Shannon capacity bound of communication channels because the bound is based on the assumption that frequency, or equivalently time is the only physical dimension available for discriminating between signal sources and also between signal and noise. Spread-spectrum coding cannot improve this bound because it concerns modulation within the channel, redistributing the use of the spectrum rather than introducing a new dimension. Other parameters have contributed physical space as a multiplexing and multiple access dimension only in a relatively limited sense, notably in the following ways.

In cellular communication, direction can be used for better reuse of channels in neighbouring cells, at the cost of added antenna complexity. Division of the solid angle subtended by the earth's surface at a communication satellite, using directional antennas, has long been used to multiply the total number of transponded channels. Polarization is frequently used to double the number of channels in telemetry, and is now also being used for wireless and cellular communication, as described, for instance, by Juerg Sokat et al in U.S. Pat. No. 5,903,238, issued 11 May 1999. Small antenna arrays are being researched for similarly improving link bandwidths, and this is somewhat inappropriately termed space division multiplexing by some authors, in view of the larger antenna cross-sections and multiplexing of the directional patterns of the antenna elements, albeit only within the point-to-point link and between the link end points.

The prior ideas of using the spatial dimensions for multiplexing thus have been limited to single link or cellular scenarios. They did not enable general use of physical space as a multiplexing dimension that in principle would have permitted discrimination and selection of signals from an unlimited number of sources, and might have obviated time or frequency division, and the base stations networks currently needed for cellular localization of channel allocations.

Prior Methods and their Difficulties.

Based on the equations cited above, the means described in the first copending application for realizing H generally involve continuously varying intervals, of sampling in digital signal processing suitable at long wavelengths, or of diffraction gratings, for use at optical wavelengths. As such these mechanisms would have to be incorporated in the frontend antennae or optical subsystems, which are generally difficult to access and would entail custom design. In the method of the second copending application, for instance, an inverse shift $H^{-1}(\beta) \equiv H(-\beta)$ is needed to restore selected signals back to their original frequency bands, following a first shift by $H(\beta)$ and band-pass filters to select the signals; the signal samples have had to be interpolated to the corresponding nonuniform sample instants. Similar interpolation could be used also for the first $H(\beta)$ operator with conventional frontend subsystems. Correctness of inversion is also unobvious because of the reinterpolation, and its empirical verification would always be incomplete as it is physically impossible to test with all possible input signals. A fundamentally different approach seems necessary even to complete the theoretic picture.

There are also practical problems with interpolating samples, namely that every stage of interpolation adds noise due to its finite order and precision. Moreover, each interpolation must ensure an exponential profile of sampling interval variation in order to obtain a uniformly scaled spectrum. This requirement comes from equation (2) due to a correspondence of $\hat{k}$ to the instantaneous sampling interval $\tau$ established in the first copending application. Small deviations from the exponent are to be expected, and would further blur the spectrum. Difficulties of uniformly varying grating intervals, let alone exponentially over time has been already noted in the first copending application as one of the key contributing reasons why such shifts were hitherto unnoticed.

While analogue-to-digital convertors (ADC) routinely provide 8 or 12 bits per sample, corresponding to 256 or 4096 quantization levels, respectively, for audio, similar precision at radio frequencies (RF) is generally unavailable. Interpolating samples quantized at 3 or 9 levels, as in radio telescopes including the Arecibo, could render the data too noisy. The digitization is commonly performed at intermediate frequencies (IF), at which the phase differences are smaller and could be lost in the interpolation noise. Moreover, much ongoing work in radio astronomy concerns the power spectrum at 100 GHz and above, for which the conventional ADC-DFT scheme becomes quite impractical. Since there is little interest in the time-domain signal waveform per se, the method preferred is correlation spectroscopy, wherein an auto-correlation is first computed, whose Fourier transform then directly yields the power spectrum via the Wiener-Khintchine theorem.

Early correlators were all-analogue, comprising two or more tapped delay lines (or "lags"), one set for each channel, two or more channels being fed in pairs in opposite directions and multiplied together at each tap to compactly obtain the autocorrelation function. These correlation outputs are typically integrated for a preset interval before being digitized and input to a DFT. Increasingly, the correlations are performed digitally, which avoids attenuation in the lags that had limited the bandwidth of analogue correlators. As the correlation already contains the power spectrum information, the selection of chirp eigenfunctions must be performed before or within the correlation, i.e. before the sampling for the DFT in the analogue case, so the mechanism of varying the sampling interval is useless in this fairly common case broadly representative of high frequency spectrometry.

Summary of the Problem and Need

The basic difficulty for a fundamental alternative is the requirement that the receiver variation cannot be equivalent to any static nonuniform pattern. Exponential rulings, for instance, can be produced with precision, but as explained in the first copending application, they would merely blur the spectrum instead of scaling, as the rays of different frequencies, diffracted from different regions of the nonuniform grating, would be combined simultaneously. Such a grating could be spun on a transverse axis, so as to instantaneously present exponentially varying grating intervals to the rays, and the blur should then diminish to reveal scaling, but the result would not be different from the methods of the first copending application, and would not adequately address the difficulties identified above.

A need exists, therefore, for a method that can provide the distance-dependent scaling of signal spectra fundamentally without requiring varying of sampling or grating intervals. Such a method could be also more generally suited for optical applications, like correlation spectroscopy, and would be preferable in any case also in digital systems from the perspective of noise.

SUMMARY OF THE INVENTION

Accordingly, the primary object of the present invention is to provide very general methods for obtaining distance-dependent frequency scaling without nonuniform sampling and without having to vary grating intervals. A second object is to enable more flexible and robust realizations of the distance-dependent frequency scaling operator avoiding problems of custom design and blurring, and in a form suitable for incorporation downstream from antennae or optical frontends, as well as in correlation spectroscopy. A further object is to provide a fundamental alternative to varying of grating or sampling intervals so as to complete the theoretic picture, and thus make distance-dependent frequency scaling a reliable foundation for future communication technology.

The present invention achieves these objects, and others which will become apparent, by transferring the requirement of exponential temporal variation from the grating or sampling intervals to a subsequent set of path delays, which have a bulk form and can be generally varied more easily and robustly.

A. Inventive Principle for Optical Systems

In an optical system involving a diffraction grating or a prism, the applicable path delays concern the optical path after the grating or prism, and could be varied by incorporating an optical medium whose refractive index can be varied by means of a bulk property of the medium. For example, using a medium that exhibits Faraday rotation and circular polarizers, the effective refractive index can be controlled by applying a magnetic field along the optic axis.

The goal of scaling the received frequencies in proportion to the source distance is achieved by the resulting modification to the grating equation $$n\lambda = \eta l \sin\theta \qquad (8)$$

as applied to the incorporated optical medium, where $l$ denotes the grating interval, $\theta$ is the nth order diffraction angle, $\lambda$ is the actual wavelength received, and $\eta$ is the refractive index of the medium. It implies the differential relation $$n\delta\lambda = \frac{d\eta}{dt} l \sin\theta \delta t + \eta \frac{dl}{dt} l \sin\theta \delta l + \eta l \frac{d\sin\theta}{dt} \delta\theta. \qquad (9)$$

Since the angle $\theta$ is itself the measure of frequency, the last term is unusable. Variation of $l$, implicitly assuming constant refractive index $\eta=1$, is the inventive mechanism already described in the first copending application. The remaining term, the first, represents refractive index variation and yields $$n\frac{d\lambda}{dt}\bigg|_{l,\theta} = \frac{d\eta}{dt} l \sin\theta. \qquad (10)$$

Dividing this by equation (8) and transposing lead to the condition $$\frac{1}{\eta}\frac{d\eta}{dt} = \frac{1}{\lambda}\frac{d\lambda}{dt} \equiv -\beta \qquad (11)$$

as the necessary and sufficient condition for the frequency scaling, similar to that established in the first copending application for similar variation of the grating intervals.

Equation (11) says that an exponential variation of the diffracted path refractive index will have the same distance-dependent spectral scaling effect as the variation of grating intervals in the first copending application. The basic advantage is that the grating intervals do not need to be physically varied, so that a conventional diffraction grating can be employed. The spatial uniformity of the intervals is assured so that the distance-dependent scaling of the spectrum can be obtained without blur due to nonuniformities in the grating.

B. Inventive Principle for Digital Systems

In a digital signal processing (DSP) system involving a discrete Fourier transform (DFT), the same can be accomplished by including an exponential delay for successive samples as phase shifts in the DFT.

The DFT of a function $f(t)$ for a sampling interval $\tau$ is defined in terms of blocks of N samples as $$F(m\omega_\tau) = \sum_{n=0}^{N-1} e^{jm\omega_\tau \tau} f(n\tau) \qquad (12)$$

with the inversion $f(n\tau) = \frac{1}{N}\sum_{m=0}^{N-1} e^{-jm\omega_\tau \tau} F(m\omega_\tau)$, where $\omega_\tau = 2\pi/N\tau$ so that $\omega_\tau \tau = 2\pi/N$ identically, representing constant phase increments. The inversion depends on the orthogonality condition $$\sum_{n=0}^{N-1} e^{im\omega_\tau \tau} e^{i(kr-n\omega_\tau \tau)} = \sum_{n=0}^{N-1} e^{ikr} e^{i(m-n)\omega_\tau \tau} \qquad (13)$$

$$= e^{ikr} \frac{1-e^{i(m-n)}}{1-e^{i(m-n)/N}} = e^{ikr} N\delta_{mn},$$

where $\delta_{mn}$ is the Kronecker delta, of value 1 if m=n and 0 otherwise. With distance-dependent frequency scaling, the discrete orthogonality condition should change to $$\sum_{n=0}^{N-1} e^{im\omega_\tau \tau \Delta(t)} e^{i[kr\Delta(r)-n\omega_\tau \tau]} = \qquad (14)$$

$$e^{ikr\Delta} \frac{1-e^{i(m\Delta-n)}}{1-e^{i(m\Delta-n)/N}} = e^{ikr\Delta} N\delta_{(m\Delta)n},$$

corresponding to equation (4). The signs of the exponents in equations (12) identify the inversion with the second factor, exp(i[krΔ−nω$_\tau$τ]), on the left side of equation (14), and the forward transform, with the first factor, exp(imω$_\tau$τΔ). The latter already includes the frequency shifts because of Δ, hence an inversion with the unmodified phase increments nω$_\tau$τ will force the selection, via the sum on the right of equation (14), of only the chirp eigenfunctions exp[i(krΔ(r)−ωt)], as explained for equation (4). As Δ is not a priori computable and the remaining factors i, m and ω$_\tau$τ≡2π/N are all numeric constants, the mechanism for inducing Δ(t) into the first factor has been unobvious.

The solution provided in the first copending application is to exponentially vary the sampling interval τ, equivalent to the receiver's scale of time relative to the source, such that $$-\frac{1}{\tau}\frac{d\tau}{dt} = \frac{1}{\hat{k}}\frac{d\hat{k}}{dt} = \beta, \qquad (15)$$

corresponding to equation (11). The same incremental rate of change of phase as in equations (5), (6) and (7) then results, viz $$\delta\omega \equiv \frac{\partial\phi}{\partial\tau}\frac{d\tau}{dt} = \frac{\partial\phi}{\partial k}\frac{d\hat{k}}{dt} = \beta\hat{k}r \equiv \frac{\hat{\omega}\beta r}{c}, \qquad (16)$$

thus inducing Δ into the forward transform. The exponential sampling is represented by the sampling instants $t_n = t_0 \exp(-n\beta)$ and the intervals $\tau_n = t_{n+1} - t_n$ for n≥0, yielding the modified transform $$\mathcal{F}(m\hat{\omega}_0) \equiv \sum_{n=0}^{N-1} e^{im\hat{\omega}(\tau_n)\tau_n} f(\tau_n) \qquad (17)$$

where $\hat{\omega}(t_n) = \hat{\omega}(t_0)e^{n\beta}$ and $\hat{\omega}_0 = \hat{\omega}(t_0)$.

The delays $\tau_n$ and frequencies $\hat{\omega}(t_n)$ are inversely related, so the summed phase increments are necessarily identical, i.e. for any pair of indices m and n, $\hat{\omega}(t_n)\tau_n - \hat{\omega}(t_{n-1})\tau_{n-1} = \hat{\omega}(t_m)\tau_m - \hat{\omega}(t_{m-1})\tau_{m-1}$. It follows that the transformation kernel is exactly the same as in the ordinary DFT (equation 12), the sole effect of the exponential sampling being in the sampling instants, such that $$\mathcal{F}(m\hat{\omega}_0) = \sum_{n=0}^{N-1} e^{im\hat{\omega}_0\tau_0} f(t_n). \qquad (18)$$

The variable grating scheme of the first copending application is equivalent to exponential sampling, as the measured amplitude at any given angle of diffraction θ is again a sum of wavefronts that arrive at the grating at exponentially varying times. Equations (17) and (18) are therefore also valid for variable gratings, and imply, in reverse, a DSP equivalent of refractive index variation. In this, the transform of equation (18) should be realizable with uniform sampling $\tau_n = \tau$ and $t_n = t_0 + n\tau$ for all n, provided the resulting samples $f(t_n)$ are summed with exponentially changing phase shifts similar to those obtained by the refractive index variation given by equation (11). It calls for modifying the kernel of the Fourier transform, equation (12), exponentially while keeping the intervals τ fixed, i.e. by varying the frequency selections $\hat{\omega}(t_n) = \hat{\omega}(t_0)e^{n\beta}$; since the τ are constant, the phases are not restored to the Fourier values, as was the case in equation (18). The result, descriptive of both the optical and the digital implementations, is the transform $$\mathcal{F}(m\hat{\omega}_0) \equiv \sum_{n=0}^{N-1} e^{im\hat{\omega}(t)\tau_0} f(\tau_n) \text{ where } \hat{\omega}(t) = \hat{\omega}_0 e^{\beta\tau_n}. \qquad (19)$$

This is simply the basic exponential chirp transform, whose equivalence to the transform of equation (18) is straightforward and will be explained in the Detailed Description. The invertibility of both transforms also follows from this sample delay-phase argument, as will become clear from the Detailed Description.

The advantages are the elimination of sample interpolation and its associated noise, and capability for use without interpolation downstream from the antenna frontend, including at intermediate frequencies wherein the path phase differences would be smaller than at the frontend carrier frequencies and could be otherwise lost in the interpolation noise. The time-domain waveform, with chirp characteristics, can be reconstructed from $\mathcal{F}$ by a conventional (unmodified) inverse DFT (second of equations 12).

C. Inventive Principle for Correlation Spectroscopy

In a spectrometer employing autocorrelation to directly compute the power spectrum, the selection of chirp eigenfunctions, must be performed before or within the correlation, as explained in the Background. This selection would be achieved simply by setting the successive lags in the correlation to exponentially changing values, corresponding to the sampling intervals τ in equation (15).

This entails variation spatially, between the successive lags encountered by the signal, and temporally, as all of the lags must be also varied exponentially over an integration window.

The subsequent Fourier transform is applied to the autocorrelation function $$R(\tau) = \int_T f(t)f(t-\tau)dt \qquad (20)$$

computed over a correlation window T, to yield the spectral power density $$|F(m\omega_\tau)|^2 \equiv \sum_{n=0}^{N-1} e^{im\omega_\tau \tau} R(\tau). \quad (21)$$

There is no scope for analogous exponential variation of phases in equation (21), however, for distance dependent frequency scaling in correlation spectroscopy, as $R(\tau)$ does not bear a direct relation to time like $f(t)$. Rather, the value of R at any specific $\tau$ comprises contributions from $f$ at multiple values of t spanning the entire correlation window T, and the spectral phase gradient of $f(t)$ is not preserved in its autocorrelation $R(\tau)$, meaning that the source distance information, which is only contained in the spectral phase gradient, is lost in $R(\tau)$.

Although the lags delay successive samples in the autocorrelation according to equation (15) governing variable sampling, they indeed represent the variable phase delays of equation (19) since all of the lags are successively applied to each instantaneous value of $f(t)$, in an analogue correlator, and to each sample in a digital correlator. While equation (19) only requires a purely temporal variation, explicit spatial variation, i.e. between the instantaneous successive lags also becomes necessary in this case for complete equivalence to the path delays in the diffractive case, as will become clear from the Detailed Description.

D. Variations and Scope

Numerous variations of the present invention and its combination with the methods of the first copending application, are possible, as illustrated by the principle for correlation spectroscopy, and are intended within the scope of the present invention.

Notably, the fact that equation (19) is the basic exponential chirp transform suggests that virtually any known method of chirp transform or extraction can be employed similarly for obtained distance-dependent scaling of source frequencies, and enabling such usage is intended in the present invention. Likewise, other optical chirp transforms may be employed for the same purpose, viz for obtained distance-dependent scaling of source frequencies, instead of the variable grating mechanism of the first copending application and the refractive index variation scheme just described, and is similarly within the present intent and scope. Further, as illustrated by the application to correlative spectroscopy, chirp transforms in the form of varying sampling intervals or delays, represented by equations (18) and (19) respectively, may be indirectly applied in various ways in combination with or as modifications to spectral analysis or selection, so as to spectrally obtain or exploit the source-distance information contained in the phases—all such uses and implementations would be clearly illustrative of the present invention, and are therefore intended within its intent and scope.

Various means for path delays are envisaged in the present invention. For example, instead of a solid medium and Faraday effect, a liquid crystal medium could be employed in an optical implementation, wherein the optical path length can be controlled and varied using a longitudinal electric field instead of a magnetic field. This could be more suitable for compact realization and support linear polarization. Other materials and their properties could be analogously used as appropriate.

A more mundane variant, suitable with a photodetector instead of visual observation of the spectrum, is to use a lens of variable focal length and to physically move the photodetector and the lens longitudinally while simultaneously adjusting the focal length so as to achieve the same path length variation. The advantage would be that no material medium of variable optical properties is then necessary; this could be useful for avoiding absorption and scattering noise from the material media, as well as constraints on the polarization. The only robust variable focal length optics available today is the telescoping zoom lens commonly found on cameras, and the speed of mechanical motion would as such limit the $\beta$ realizable. More options will likely become available from emerging technologies like "smart materials".

The combination of fixed grating and a variable refractive index medium as such permits two variants depending on whether the grating is of transmission or reflection type. In the latter case, the incident rays would also enter through the medium, but the condition of equation (11) remains unaltered provided the rays continue to travel equal, albeit now changing, optical paths before the grating.

In digital systems, there is as such a choice, as will become clear from the Detailed Description, of whether to precompute the phase shifted coefficients of the modified DFT or to compute the phase shifts as and when needed. There will also likely be many ways to optimize the modified DFT computation just as there have been for conventional DFT, like the fast Fourier transform (FFT) and fftw, the "Fastest Fourier Transform in the West".

In principle, the variation of the lags and the path delays or phases should be exponential, as prescribed by equations (18) and (19), respectively. A linear variation would be an adequate approximation for most applications, however, as will be explained in the Detailed Description. Non linear variation, not necessarily exponential, could be additionally employed, say, to correct for dispersion or fading between the source and the receiver. All such variations are intended within the present invention, and would be similarly applicable to the inventive variation of grating or sampling intervals described in the first copending application. Also it would be obvious to anyone skilled in the relevant arts that the present invention can also be combined with the variable sampling methods of the first copending application, although the utility of such a combination would be likely limited due to its added complexity.

Further, the variation of the lags or path delays can be repeated over successive observation intervals, so as to enhance the observability of the scaled spectra, as described in the first copending application for the alternative inventive methods described therein. The repetition can be performed by resetting the refractive index, or the lags or delays, before each successive interval. The same result can also be achieved by reversing the sign of $\beta$ between alternate intervals.

Numerous other objects, features, variations and advantages of the present invention will be apparent when the detailed description of the preferred embodiment is considered in conjunction with the drawings, which should be construed in an illustrative and not limiting sense.

BRIEF DESCRIPTION OF DRAWINGS

FIG. 1 is a diagram of a diffractive spectrometer incorporating the present invention.

FIG. 2 is a graphical representation of the basic process of Fourier analysis to explain the present invention.

FIG. 3 is a graphical representation of the modification to the basic process of Fourier analysis provided by the present invention.

FIG. 4 is a graphical analysis of the modified process of Fourier analysis presented in FIG. 3.

FIG. 5 is a graphical representation of the usual relation between sampling rate and sample path delays.

FIG. 6 is a graphical representation of the modified relation between sampling rate and sample path delays effected by the inventive methods described in the first copending application.

FIG. 7 is a graphical demonstration of the same modified relation between sampling rate and sample path delays as in FIG. 6 being achieved by the present invention.

FIG. 8 is a graphical computation of the path delays needed to reverse or undo the modification to the basic process of Fourier analysis provided by the present invention.

FIG. 9 is a graphical computation of sampling times needed to reverse or undo the modification to the basic process of Fourier analysis represented in FIG. 6.

FIG. 10 is a graphical representation of the modified relation between sampling rate and sample path delays achieved by a combination of the methods of the first copending application and the present invention.

FIG. 11 is a graphical computation of the path delays and sampling times needed to reverse or undo the combination of methods represented in FIG. 10.

FIGS. 12-13 are block diagrams for a conventional discrete Fourier transform.

FIGS. 14-15 are block diagrams for a discrete Fourier transform incorporating the inventive method of the first copending application.

FIGS. 16-17 are block diagrams for a discrete Fourier transform incorporating the present invention.

FIG. 18 is a block diagram for an autocorrelator incorporating the present invention.

DETAILED DESCRIPTION OF THE PREFERRED EMBODIMENT

Accordingly, the principle of the present invention is to transfer the temporal variation, required in the spectral analysis or selection process of a receiver for obtaining distance-dependent scaling of received frequencies, from the individual grating or sampling intervals at the receiver front end or at the front end of the spectral analysis or selection process, where they would be difficult to incorporate, to a subsequent set of path delays generally having a bulk character and being also easier to vary in a controlled manner.

The preferred embodiment of the present invention accordingly comprises physical or computational means for effecting these path delays and for varying them both temporally, as required by the inventive principle, and spatially, as required for specific cases like correlation spectroscopy. The variable refractive index form of the preferred embodiment for optical implementations will be described first, to illustrate the principle.

The physics of distance-dependent scaling of received frequencies will be graphically explained next, as the foundation both for graphical proof of equivalence of the present inventive principle to variation of grating or sampling intervals prescribed in the first copending application, for graphical treatment of the inverse transformations of both variations as necessary for separating co-channel signals as described in the second copending application, and for the detailed description of both digital and correlation spectroscopy forms of the preferred embodiment.

FIG. 1 illustrates the variable refractive index form of the preferred embodiment for optical systems using diffraction. It shows a conventional diffraction grating [100] comprising an array of slits [110-130] separated by intervals [140] each of length l. A lens [150] focuses rays diffracted by the grating [100] to form a Fourier spectrum over its focal plane [160], where one or more photodetectors [170] may be placed to measure and record the spectra. This combination of a grating and a focusing lens constitutes the simplest arrangement for Fourier spectroscopy, as treated, for instance, in the classic text *Principles of Optics*, by Max Born and Emil Wolf (Pergamon Press, 1959), and it would be straightforward, for those skilled in the relevant arts, to extend the inventive principle from this basic combination to more sophisticated arrangements.

The inventive principle involves placing a medium [300] having a temporally variable refractive index η(t) immediately after the grating [100], so as to subject all the diffracted rays to continuously increasing phase delays according to equation (19). The medium [300] does not need to extend all the way to the lens [150], and by the same token, it would not need to extend to the focal plane [160], if the lens [150] were replaced by a concave mirror. The inventive principle requires varying the instantaneous refractive index η(t) of the medium [300] during each observation of the spectrum in the focal plane [160]. In practice, as explained in the first copending application, the variation would be repeated over successive integration intervals of time Δt, which can be further chosen short enough to limit any blurring from nonexponential variation, so that the repetitive variation can be made simply linear. The incremental change over such a window would be $$\hat{k}^{-1}\Delta\hat{k} = e^{\beta\Delta t} - 1 \approx \beta\Delta t + o(\beta\Delta t) \qquad (22)$$

where the o(x) notation means higher orders in x and denotes the error. If $|\beta\Delta t| \approx 10^{-3}$ or less, then the total normalized change $|\hat{k}^{-1}\Delta\hat{k}| \equiv |\eta^{-1}\Delta\eta| \equiv |\tau^{-1}\Delta\tau| \approx |\beta\Delta t|$ as well and can be linear, yielding an error of less than 1% due to nonexponential variation.

Another reason to keep $|\beta\Delta t|$ small relates to the input bandwidths and the Nyquist criterion especially when scaling up the received frequencies by a large factor i.e. for $\beta \equiv \alpha c \gg 0$. In this case, the receiver variation becomes more responsible for the frequency scaling than the source distances r, and means that the receiver and its inventive modification, represented by the diffracting grating [100] and the medium [300] in the present case, would have to deal with a larger range of incoming wave frequencies, given by $\Delta\hat{k}$, than the achieved shifts $\delta\omega = \beta r/c$. The input range $\Delta\hat{k}$ worsens exponentially at large $|\beta\Delta t|$, becoming 1.72 at $|\beta\Delta t|=1$, 6.39 at $|\beta\Delta t|=2$, etc., meaning that the grating [100] and the medium [300] would need to handle wavelengths from deep infrared through deep ultraviolet in each sweep of the integration window. A basic solution explained in the copending application is to use fairly short integration intervals Δt, so as to exploit the exponential nature of the required change. Taking Δt=1 μs, for instance, allows $\alpha=1$ m$^{-1} \equiv \beta = 3 \times 10^8$ s$^{-1}$ to be realized by a smaller total variation $$(\hat{k}^{-1}\Delta\hat{k})|_{\Delta t} = (\beta \times 1 \text{ s})^{\Delta t/1 \text{ s}} = 0.0000195, \qquad (23)$$

so that the incremental rate of change is much smaller, $\beta'=19.5$ s$^{-1}$, and avoids the Nyquist problem.

Further, the received waves must have a coherent spread of frequencies over this large range in order to present a scaled spectrum of measurable intensity. Fortunately, most sources of light and modulated carriers do generally possess relative bandwidths of at least 10$^{-3}$, and hence would present scaled spectra of adequate strengths.

As in the variable grating method of the first copending application, the object of the inventive principle is to cause the successive rays imaged at a focal point [260] to have slightly different wavelengths so as to yield a chirp eigenfunction instead of a sinusoid. Specifically, the wavefronts of a first ray [210] arriving through a first slit [110] near one end of the grating [100] ordinarily interfere constructively with those of a second ray [220] arriving through the next slit [120] after a time interval of $\tau \equiv l/c = n\lambda/c$, and with those of a third ray [230] admitted by the third slit [130] after a further interval of $\tau$ in absence of the inventive operation.

In the method of the first copending application, the grating intervals l are varied, say reduced, over each time window $\Delta t$, and reset so as to repeat for the next window $\Delta t$, so that the wavefronts of the first ray [210] constructively interfere with those of the second ray [220] arriving via the second slit [120] at a slightly shorter wavelength $\lambda_0$ and with those of the third ray [230], at an even shorter wavelength $\lambda_1$. By the time the first wavefront crosses the grating [100] at the third slit [130], all of the intervals [140] would have been uniformly reduced, so that the wavefronts then arriving through the first slit [110] would also constructively interfere only at the reduced wavelength $\lambda_2$, but only with even shorter wavelength contributions from the slits traversed by the second and third rays [220,230]. Repetitive variation of the grating intervals [140] thus causes the spectrum to be scanned once in each time window $\Delta t$, and importantly, the scanning results in waveforms of continuously changing wavelengths, i.e. chirps, being presented to the photodetectors [170] in the focal plane [160], instead of the pure sinusoids expected in Fourier spectroscopy.

In the present invention, the same result is sought by varying $\eta$ over each time window $\Delta t$ instead of the grating intervals [140]. By decreasing $\eta$, the constructively interfering contribution from the second ray [220] is forced to come from a slightly shorter wavelength $\lambda_1$, and that from the third ray [230], at an even smaller wavelength $\lambda_2$, etc. As before, a wavefront that arrives at the first slit in step with one at the third slit will contribute only at the smaller wavelength $\lambda_2$, but its contribution will reach the focal plane [160] only later, and therefore only combine with the even shorter wavelengths from the other slits. The spectrum thus gets scanned exactly once over each time window $\Delta t$, and the scanning yields chirp waveforms in the focal plane [160], just as if the grating intervals had been varied instead of the refractive index.

This scanning of the spectrum and the extraction of chirp components is graphically illustrated in FIGS. 2 through 4. The figures show how the receiver's view of the frequency spectrum of received waves is modified by the present invention. In each figure, the receiver's view of the spectrum is depicted as a vertical window [10], so that the receiver's spectral eigenstates and the incoming waveforms they select can be drawn side by side to explain the mathematical process of observing the spectrum.

FIG. 2 illustrates conventional (Fourier) analysis, in which the receiver's spectrum window [10], i.e. the range of frequencies it can observe, is static. An incoming waveform $f(t)$ [30], which may be written as $|\eta\rangle$ following the notation of quantum mechanics, is multiplied by each of a multitude of receiver eigenstates $\exp(i\hat{\omega}_j t) \equiv \langle \hat{\omega}_j |$ to yield the amplitudes $$F(\hat{\omega}_j) \equiv \langle \hat{\omega}_j | f \rangle = \int_T e^{i\hat{\omega}_j t} f(t) dt, \qquad (24)$$

where the integration occurs over a finite time window T. The physical measurements typically represent the intensities $|F(\hat{\omega}_j)|^2 \equiv |\langle \hat{\omega}_j | f \rangle|^2$ of these spectral components, but the integral transform of equation (24) is necessarily involved in a macroscopic form relative to the wavelengths of interest. In an optical spectrometer, for instance, like the basic Fourier scheme of FIG. 1 without the medium [300] and the inventive variation of its refractive index, this integral transform is physically performed by diffraction and the combining, by the lens [150] to each focal point [260] in its focal plane [160], of the diffracted wavefronts from an extended region of the diffraction grating [100] and spanning an extended integration window T. In FIG. 1, the wavefronts from three successive slits, [210], [220] and [230], that correspondingly arrived at the grating [100] successively at times $t_0$, $t_1 \equiv (t_0 + n\lambda_0/c)$ and $t_2 \equiv (t_0 + n\lambda_0/c + n\lambda_1 c)$ are thus combined, so that $T \geq (n\lambda_0/c + n\lambda_1/c)$, n denoting the order of diffraction.

Conventional spectrometry assumes that there is no change in either the grating intervals [140] or the refractive index after the grating [100], hence $\lambda_0 = \lambda_1$ and $T \geq 2n\lambda_0/c$. Each of the integrals (24) is actually obtained as a discrete sum given by the first of equations (12), where N represents the number of slits of the grating [100].

The spectral window [10] of the receiver is accordingly represented by a set of frequencies $\hat{\omega}_0$, $2\hat{\omega}_0$, $3\hat{\omega}_0$, etc., at which the above integrals are effectively computed. Each of these frequencies thus corresponds to a position in the spectral window [10]. For illustration, the figure shows three representative positions, for red [23], green [25] and blue [27], respectively, and the corresponding red [24], green [26] and blue [28] eigenstates, which would be sinusoids of frequencies $\hat{\omega}_j \equiv j\hat{\omega}_0$, are shown on the left of the spectral window [10], so that the integration may be imagined as resulting from the meeting of the eigenstate waveforms with the received waveforms at the spectral window [10]. In particular, a sinusoidal received wave [31] would get integrated to $$\int_T e^{i\hat{\omega}_j t} e^{-i\omega t} dt \approx 2\pi T \delta(\omega - \omega_j), \qquad (25)$$

which is nonzero only at $\omega = \omega_j$ and would yield a single illuminated point in the focal plane [160] for each order of diffraction $n > 0$.

FIG. 3 illustrates the impact of variation of either the grating intervals, as prescribed in the first copending application, or the refractive index of a medium [300] according to the present invention, during the process of observation, i.e. during the integration (24). Consequently, the wavelength contributions in the integration can no longer be equal, i.e. $\lambda_0 \neq \lambda_1$, and this variation must be attributed to the eigenstates multiplying the received waveforms because only the eigenstates physically belong to the receiver and can be susceptible to its variations. Assuming a monotonic variation, each of the eigenstates would now represent a waveform of changing wavelength, and further, each eigenstate continually shifts with respect to the incoming frequencies because, as already noted, a later wavefront arriving at slit [110] can only combine with still later wavefronts arriving at slits [120] and [130] and only at already decreased wavelengths, given either a continuous reduction of the grating intervals [140] or increase in the refractive index of medium [300]. This is as if the receiver window [10] were sliding downward, towards higher incoming frequencies, and dragging its eigenstates down as well in the process, relative to the unaffected incoming waves, illustrated by the red [34], green [36] and blue [38] sinusoids in the figure. As explained for the variation of grating intervals [140] in the first copending application, the receiver window [10] can be made to slide repeatedly over a specified range of wavelengths in successive observation intervals by resetting the refractive index of the medium [300] before each interval, or by reversing the sign of variation over alternate intervals.

In the presence of such variation, therefore, the simple orthogonality of the receiver eigenstates to received sinusoidal waveforms, equation (25), can no longer hold, as the eigenstates are no longer sinusoids but possess continuously varying wavelengths. In particular, they can no longer be orthogonal to pure sinusoids, as $$\int_T e^{i\hat{\omega}_j(t)t} e^{-i\omega t} dt \approx 0 \text{ for } |T| \gg 0, \qquad (26)$$

for all j, as each $\hat{\omega}_j(t)$ is a changing function of the time t. Orthogonality will hold, however, with respect to similarly varying received waveforms, i.e.

$$\mathcal{F}(m\hat{\omega}_j) = \int_T e^{i\hat{\omega}_j(t)t} e^{-i\omega(t)t} dt \approx 2\pi T\delta[\hat{\omega}_j(t) - \omega(t)], \quad (27)$$

provided $\omega(t)$ has the same functional dependence on t. [Note that the domain of the $\delta$ function in equations (25) and (27) is the space of the functions $\hat{\omega}_j$, and not merely scalar values $\hat{\omega}_j(t)$ for some t.]

FIG. 4 illustrates this notion by projecting the eigenfunctions on to the right side of the receiver window [10] and lining them up with a corresponding received waveform [32] with a similar continuous variation of its frequency, to show that exactly one nonzero integral would result representing the orthogonality. FIG. 4 shows that the spectrum reported by a changing receiver cannot correspond to the sinusoidal components of received waves, as assumed in conventional spectroscopy, but to chirp components of those waves. These chirp components are constructed by the receiver itself by combining contributions from successively changing wavefronts, as explained for a diffraction grating [100] with a varying refractive index medium [300] in FIG. 1.

The figures also partly illustrate a further property, of particular interest in the present invention, that the extracted chirps are also displaced in frequency in proportion to the distances to the wave sources. This property may be difficult to understand, although dictated by equations (5)-(7), because an ideal chirp encompasses all possible wavelengths from 0 to $\infty$, allowing no a priori association with a specific frequency. An orthogonal basis set of chirps is also unintuitive as the basis functions would be ordinarily expected to differ in shape so that they cannot be made to overlap by any simple combination of translations and amplifications. In the ordinary spectral decomposition depicted in FIG. 2, the basis set is the set of sinusoidal eigenfunctions represented by [24], [26] and [28], whose differences in frequency ensure that they cannot overlap by translation.

FIGS. 3 and 4 explain the altered basis set resulting from a variation of grating intervals [140] according to the first copending application or a refractive index according to the present invention. FIG. 3 depicts the eigenstates as chirps and the received frequencies as sinusoids, taking the universe as the reference for the time scale of observation process. The receiver's scale of time may be taken for reference instead. Both the grating intervals [140] and the sampling intervals would be uniform in this scale, and the chirp eigenstates [24], [26] and [28] become pure sinusoids just like in FIG. 2, so the range of eigenstates forming the receiver's spectral window [10] should retain the same physical role it has in absence of the inventive variation, viz as the Fourier basis for decomposing received wave functions that can be represented by their linear combinations.

This is a strong requirement because the inventive variation can be made arbitrarily slow, i.e. $|\beta| \to 0$, and this role the eigenstates cannot take effect abruptly when $|\beta|$ becomes exactly zero. In this "scaling reference frame" of the receiver, actual sinusoidal waves [34], [36] and [38] must conversely appear as chirps, and only actual chirps themselves, like the chirp waveform [32] indicated in FIG. 4, would appear as sinusoids that match the receiver's eigenstates. The set of receiver eigenstates thus remains the basis for representing all waveforms constructible by their linear combinations, and equation (27) defines a Fourier decomposition in the receiver's scaling reference frame.

Two related issues are how the virtually identical chirp eigenstates can be distinguished in the ordinary "nonscaling reference frame" of the rest of the universe, and how they become selected only in proportion to the source distances, as dictated by the theory reproduced in the Background. The only distinction between the incoming chirp waveforms seen as sinusoids of different frequencies by the receiver must be the instantaneous frequencies they present at the receiver. For any received waveform, this instantaneous matching frequency would clearly depend on the original frequency of emission at the source, the pattern of evolution of frequency in the chirp, and the source distance over which the instantaneous frequency evolves. Under an exponential variation at the receiver, as dictated by equation (2), a linear evolution gets selected, according to equations (1) and (3).

The only remaining question is whether and how the chirp components can be present in received waves in the first place just so as to be detected by such a receiver, since a mere combination of a few sinusoidal waveforms cannot possibly yield a continuous chirp. As explained in the first copending application, "chirp content" is to be expected from real sources because real sources must have nonzero spreads of frequencies, and the inventive receiver integrates wavefronts from a continuous succession of arriving Fourier wavefronts to synthesize the chirp waveforms. In the diffractive spectrometer of FIG. 1, this succession of wavefronts is selected by first or higher order diffraction ($n \geq 1$), and their integration is performed by a lens [150] to yield the chirp waveforms in its focal plane [160]. As also further explained in the first copending application, this band of frequencies necessarily coincides in phase at the source, in the sense used in the Green's function methods in calculus, viz the source being identified as a distribution of point impulses, as all of the Fourier wave components of an impulse begin with the same phase. These "phase fronts", i.e. wavefronts hypothetically drawn in the spectral domain, evolve linearly with distance because the rate of change of phase is by definition frequency. Equations (5)-(7) relate the extracted chirps with these evolving "phase fronts" via the frequency evolution factor $d\hat{k}/dt$ defining the extracted chirps.

FIGS. 5 through 7 graphically explain the equivalence of the inventive variation of the refractive index of medium [300] to the variation of grating intervals [140] prescribed in the first copending application. The latter was conceived to directly reflect the relative variation of the time scale explained by FIGS. 2-4, and it is useful to verify that the present inventive variation serves this purpose equally.

As indicated in FIG. 5, traditional spectroscopy corresponds to applying equal path delays to successive contributing wavefronts taken at equal sampling intervals, so that the sampling times and path delays have a linear relation. It is easy to demonstrate that any variation of sampling times and path delays that retains this linear relation will also yield Fourier spectra: The linear relation means that the extracted eigenvalues will have a translational invariance of the form $$\mathcal{D}f \equiv f(t+\tau) = f(t) + \tau\frac{d}{dt}f(t) + \frac{\tau^2}{2!}\frac{d^2}{dt^2}f(t) + \ldots = e^{\tau d/dt}f(t), \quad (28)$$

where $\mathcal{D}$ denotes a delay operator. The eigenfunctions of $\mathcal{D}$ are thus the same as those of the derivative operator $d/dt$, and are identified by writing $df/dt = sf$, $s \equiv \sigma + i\omega$, whence $f \propto e^{st}$, the known basis of the Fourier and Laplace transforms.

This linear sampling time-path delay profile [60] gets modified, in the methods of the first copending application, to an exponential profile [62] by applying the equal delays to wavefronts taken at exponential sampling intervals, as shown in FIG. 6. This destroys translational invariance throughout the integration window, and instead effectively introduces a rate of change factor $d\hat{\omega}/dt$ going from one sample to the next, and causing the scaling of received frequencies, according to equation (5). In the present invention, the same exponential profile [62] is achieved from uniformly sampled wavefronts by instead exponentially varying the delays applied to these samples, as shown in FIG. 7, and the delays contain the rate of change factor $d\hat{\omega}/dt$ in their own exponential variation of $\hat{\omega}(t)$ according to equation (19). The two approaches are thus equivalent in terms of extracting chirps instead of sinusoids.

The inverse transformations corresponding to the variation either of the grating intervals [140] or of the refractive index as herein prescribed can also be conveniently treated using the sampling time-path delay relation. FIG. 8 shows how to determine the path delays necessary for inverting the transformation of equation (19): one may simply add more delays to the successive samples so as to equalize the overall delays. This would correspond to $$\sum_{n=0}^{N-1} e^{i\gamma - im\hat{\omega}(t)\tau_0} \mathcal{F}(m\hat{\omega}_0) = e^{i\gamma} \sum_{n=0}^{N-1} e^{-im\hat{\omega}(t)\tau_0} \mathcal{F}(m\hat{\omega}_0), \quad (29)$$

which clearly corresponds to applying the reverse of the delays applied in equation (19), times a constant phase factor $\exp(i\gamma)$; the inversion becomes exact for $\gamma=2\pi$ or a multiple thereof. This is especially suitable for non DSP implementations like the diffractive spectrometer of FIG. 1, where actual negative delays would be unrealizable. In a digital system, all of the delays are merely computed, and the negative delays $\exp[-im\hat{\omega}(t)\tau_0]$ can be applied directly. FIG. 9 illustrates the corresponding logic for the variable sampling methods of the first copending application, suggesting that the inversion may be achieved by varying the sampling intervals in the reverse manner. Since the input would be presumably in the form of discrete samples, this would entail interpolation over the same values to obtain the new sample values corresponding to the reversed intervals.

The above ideas suggest that the variable sampling methods of the first copending application can even be combined with the variable delays prescribed by present invention, while still retaining the exponential sampling time-path delay relation to avoid blurring the source distance information. FIGS. 10 and 11 show the sampling time-path delay relations for the forward and inverse transformations for one such combination. It would be obvious that any such combination would be generally more complicated and likely have poorer performance than the path delay methods of the present invention alone.

FIGS. 16 and 17 illustrate incorporation of the present invention in a discrete Fourier transform. FIGS. 12 and 13 are block diagrams explaining the comparable computations in a conventional discrete Fourier transform given by the first of equations (12), and FIGS. 14 and 15 are block diagrams illustrating a comparable incorporation of the inventive method of the first copending application.

As shown in FIG. 12, the first element of the conventional transform, F(0), is obtained as the output [410] of a first summing device [420], whose inputs are the outputs of a first set of phase multipliers through [514], and the inputs to these multipliers in turn are derived from the input signal [400] by subjecting it to a sequence of identical delay elements [500] through [504]. As shown in FIG. 13, the second element of the conventional transform, F($\hat{\omega}$), is simultaneously obtained as the output [411] of a second summing device [421] adding the outputs from a second set of phase multipliers [520] through [524], the latter having their phase values offset from those of the first set, [510] through [514], by $\hat{\omega}\tau$. The remaining elements of the conventional transform, F($j\hat{\omega}$), for $j=2 \ldots N-1$, are computed very similarly. Numerous ways of arranging and optimizing these computations are well known, as remarked in the Background, and it would be obvious to skilled practitioners of the relevant arts how to adapt the inventive modifications to be explained in FIGS. 14 through 17 to such rearrangements and optimizations.

FIGS. 14 and 15 resemble FIGS. 12 and 13, respectively, as do FIGS. 16 and 17, because the inventive modifications to the conventional transform merely concern the values of the delay and phase elements, rather than any change to the computational structure or flow. The inventive modifications require these delay and phase elements to be dynamically varied over each integration window, just like the inventive variation of the refractive index in the spectrometer of FIG. 1.

As shown in FIGS. 14 and 15, the inventive modifications prescribed by the first copending application require changing the delay elements both temporally, as required for the variation of sampling intervals by equation (15), say by means of a temporal variation control signal [402], and spatially, in the sense that at any given instant, the delays [600] through [603] must be unequal, varying from one to the next in the same manner as the temporal variation. That is the instantaneous values of the delays $\tau_j$ must be related as $$\tau_j = \tau_0 e^{j\beta} \approx \tau_0[1+j\beta+o(j\beta)], j \geq 0, \quad (30)$$

to be consistent with equation (15). As explained with equation (22), an exponential variation, which in any case would be impossible to achieve perfectly, would be unnecessary provided $\beta \delta t \leq 10^{-3}$, for which the delays can be simply related linearly, ignoring the higher order terms $o(j\beta)$. This condition is also easily achieved and would likely hold in any realization, as explained with equation (23).

The difference in the present invention lies in shifting the temporal variation to the phase multipliers, using the same variation control signal [402], as illustrated by FIGS. 16 and 17, so that the delay elements [500] through [504] have steady values as in FIGS. 12 and 13. Unlike the variable delays [600] through [603] of FIGS. 14 and 15, the instantaneous variation between the phase multipliers within each of the sets [610] through [614], [620] through [624], etc. is governed by the Fourier transform itself (first of equations 12), as in FIGS. 12 and 13. Thus, in the place of the N delay elements, $N^2$ phase multipliers appears to be necessary in the present invention, but optimizations of the DFT like the FFT are commonly used in which the number of distinct phase multipliers, and hence the number of elements to be temporally varied, is indeed reduced to N roots of unity. As can be seen in FIGS. 16 and 17, for example, the phase multipliers [610] through [613] must always have the same instantaneous values as the phase multipliers [621] through [624], respectively, and it would be obvious to those skilled in signal processing that these two sets of multipliers can be trivially derived from a common set of phase elements controlled by the variation control signal [402], say by wiring them in parallel. The principal disadvantage, compared to the method of the first copending application, is that the present invention looks more intrusive since it affects multiple layers of multipliers within the FFT. It however overcomes the basic disadvantage of variable sampling, as represented by the varying delays [600] through [603], viz that each subsequent stage of variable sampling requires sample interpolation, which amounts to a partial regeneration of the analogue signal.

The inventive principle for correlation spectroscopy, which is illustrated in FIG. 18, closely resembles that for variable sampling, represented by FIGS. 14 and 15, in that it employs lags [800] through [803] instantaneously differing the same way as the delay elements [600] through [603], i.e. like the $\tau_j$'s given by equation (30), and varied the same way, say using the same control signal [402]. The figure shows an autocorrelator that implements the autocorrelation function of equation (20) literally but with the inventively varied lags [800] through [803] instead of constant lags. The autocorrelation $R(\tau)$ of the received waveform $f(t)$ is computed for multiple values of the time difference argument $\tau$ in parallel by a set of multipliers [700] through [704], wired as shown to multiply the instantaneous value of the waveform $f(t)$ with correspondingly delayed values $f(t-\tau_0)$, $f(t-\tau_0-\tau_1)$, $f(t-\tau_0-\tau_1-\tau_2)$ and $f(t-\tau_0-\tau_1-\tau_2-\tau-3)$, obtained from the sequence of lags [800] through [803], followed by a corresponding set of integrators [710] through [714] integrating the multiplier outputs over a correlation window T. The difference from conventional autocorrelation lies in making the lags [800] through [803] both unequal and varying over time similarly to the delay elements in FIGS. 14 and 15. FIG. 18 illustrates a particularly simplistic implementation of autocorrelation incorporating the present invention, but extension to more complex realizations of autocorrelation and correlation spectroscopy would be obvious from this to those skilled in those arts.

As noted in the Summary, variable lags are the only way to incorporate the present invention within an autocorrelation since there is no subsequent combinatorial step to which varying phase multipliers could be alternatively applied. It would be also useless, with regard to the purpose of the present invention, to incorporate the inventive temporal variation in a subsequent Fourier transform of $R(\tau)$, as the argument variable $\tau$ does not represent time itself. As explained in the Background, the distance-dependent scaling of frequencies is dependent on source distance information available in $f(t)$ in the form of the spectral gradient of phase $\partial\phi/\partial k$ (equation 7), equivalently the path length contribution kr to the instantaneous phase of a sinusoidal wave, and this phase information is eliminated in the autocorrelation by multiplying $f$ by itself and integrating over a correlation window—both operations are essential to the basic notion of autocorrelation and neither can be eliminated in order to avoid this loss of information.

Lastly, it would be appreciated by those skilled in the arts of physics, electronics and communication technologies that although the invention has been described with reference to the preferred embodiment, numerous modifications and variations are possible in light of the above disclosure.

The inventive method could be conceivably applied to sound waves in water, or to electromagnetic waves propagating through the atmosphere, for example, with suitable corrections for variations of the respective propagation speeds with respect to frequency and ambient temperature. In the refractive index implementation of FIG. 1, the lens could be replaced by a different focusing system, possibly including mirrors, and the variable refractive index medium could itself be dispensed with for example, using a varifocal lens and a mechanical or electrical arrangement to maintain the photodetectors continuously in the focal plane of the varifocal lens.

Moreover, the premise of both the present invention and that of the first copending application, that spectral phase gradients are necessarily present in real waves from real sources, as such implies that virtually any kind of chirp transform may be substituted for the basic exponential chirp transform of equation (19), and would yield the benefits of distance-dependent scaling of frequencies and separation of signals correspondingly.

All of such modifications, generalizations and variations are intended in the scope and spirit of the invention as defined in the claims appended hereto.

I claim:

1. A method for obtaining, in a receiver of electromagnetic, acoustic or other kinds of waves from one or more sources, scaling of the frequencies of the waves received from each of the sources in proportion to the distance of the receiver from that source, the method comprising the steps of:
   employing a temporal partitioning means in the receiver to identify successive portions of the received waves;
   employing one or more variable phase changing or delaying means in the receiver to subject successive portions of the received waves to successively varying phase changes or delays;
   employing an integration-transformation means in the receiver to subsequently compute or act on a resulting frequency spectrum of the received waves by combining the successive portions over an interval of time; and
   varying each of the phase changes or delays over the same interval of time.

2. The method of claim 1, wherein the temporal partitioning and subsequent integration-transformation steps compute an integral transform of the received waves.

3. The method of claim 1, wherein the temporal partitioning and subsequent integration-transformation steps compute an autocorrelation of the received waves.

4. The method of claim 1, wherein the variation of the phase changes or delays is exponential both between the successive portions and over the integration-transformation interval of time.

5. The method of claim 1, wherein the variation of the phase changes or delays is simply linear between the successive portions or over the integration-transformation interval of time, or both.

6. The method of claim 1, wherein the variation of the phase changes or delays is non linear between the successive portions or over the integration-transformation interval of time, or both, in order to correct for dispersion or fading of the waves between one or more of the sources and the receiver.

7. The method of claim 1, wherein the temporal partitioning means is a diffraction grating, the successive wave portions being identified by the portions of wavefronts passing through successive slits of the grating for any given angle of diffraction, and the integration-transformation means is a lens or a mirror.

8. The method of claim 1, wherein the temporal partitioning means comprises sampling and separate storage or handling of the samples, and the integration-transformation means is a computation.

9. The method of claim 8, wherein the phase changing or delaying means comprises multipliers applying phase factors individually to the successive wave portions.

10. The method of claim 1, wherein the temporal partitioning means comprises a sequence of delay elements and the integration-transformation means comprises one or more summing devices.

11. The method of claim 1, wherein the phase changing or delaying means involves a medium with a variable refractive index.

12. The method of claim 11, wherein the refractive index is varied by applying a bulk stress on the medium.

13. The method of claim 1, wherein the integration-transformation means involves filtering or frequency selection such as band-pass, band-stop, high-pass, low-pass or other filters.

14. The method of claim 13, wherein the filtering or frequency selection is achieved by convolution of the successive wave portions with a time-domain filter function.

15. A device for enabling, in a receiver of electromagnetic, acoustic or other kinds of waves, from one or more sources including a temporal partitioning means to identify successive portions of the received waves, and an integration-transformation means to subsequently compute or act on the resulting frequency spectrum of the received waves by combining the successive portions over an interval of time, the device comprising one or more variable phase changing or delaying means to subject the identified successive wave portions to varying phase changes or delays over the integration-transformation interval of time in between the temporal partitioning and the subsequent integration-transformation of the identified successive wave portions.

16. The device of claim 15, wherein the temporal partitioning and subsequent integration-transformation means compute an integral transform of the received waves.

17. The device of claim 15, wherein the temporal partitioning and subsequent integration-transformation means compute an autocorrelation of the received waves.

18. The device of claim 15, wherein the variation of the phase changes or delays is simply linear between the successive portions or over the integration-transformation interval of time, or both.

19. The device of claim 15, wherein the integration-transformation means involves band-pass, band-stop, high-pass, low-pass or other kinds of filtering or frequency selection.

20. The device of claim 15, wherein each phase changing or delaying means comprises a multiplier applying a phase factor to an individual wave portion among the identified successive wave portions.

* * * * *